Sept. 27, 1960 R. B. WILLIAMS, JR 2,954,167
ELECTRONIC MULTIPLIER
Filed Sept. 20, 1955 4 Sheets-Sheet 1
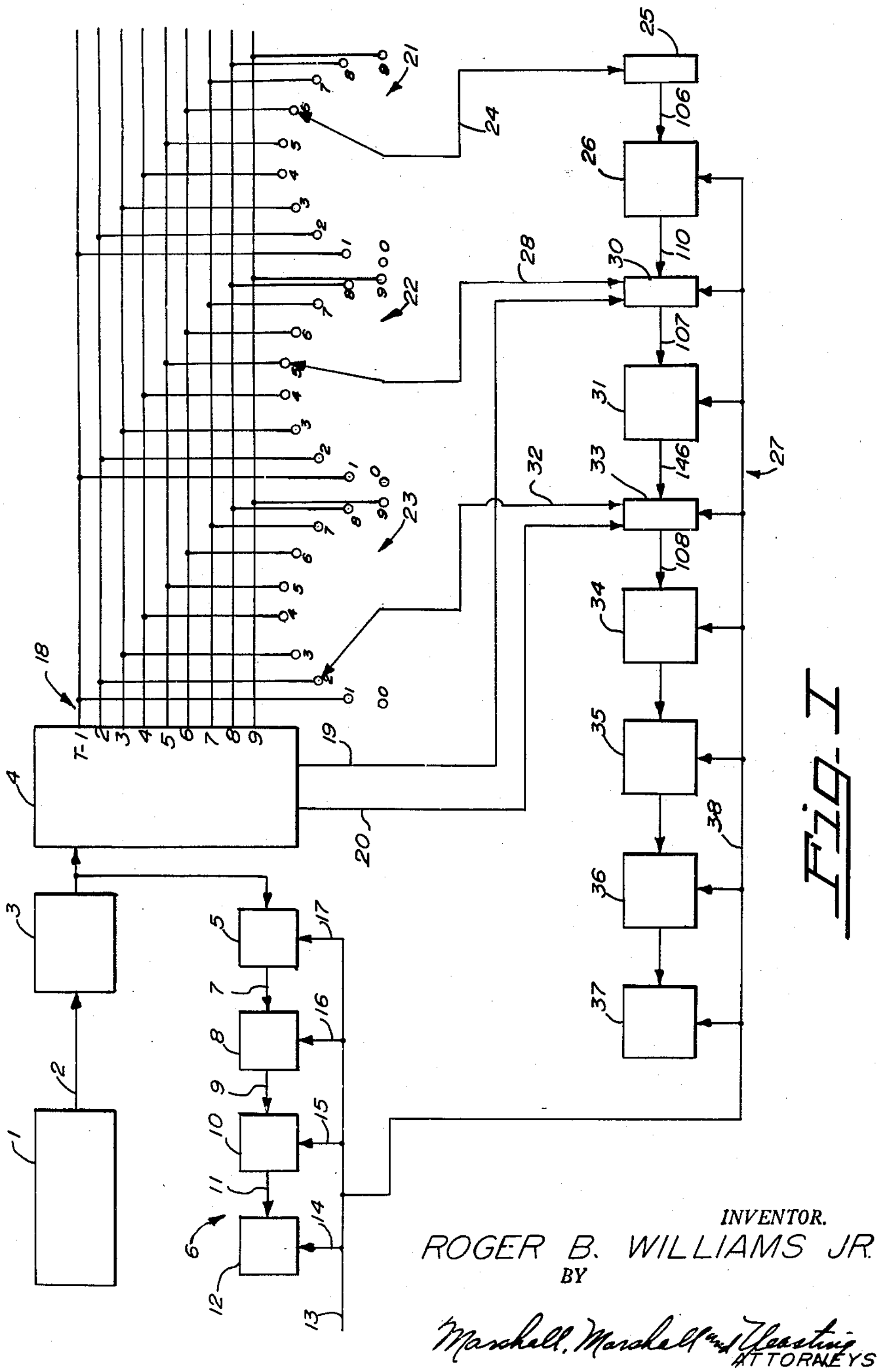
Fig. I
INVENTOR.
ROGER B. WILLIAMS JR.
BY
Marshall, Marshall and Yeasting
ATTORNEYS ELECTRONIC MULTIPLIER
Filed Sept. 20, 1955 4 Sheets-Sheet 2
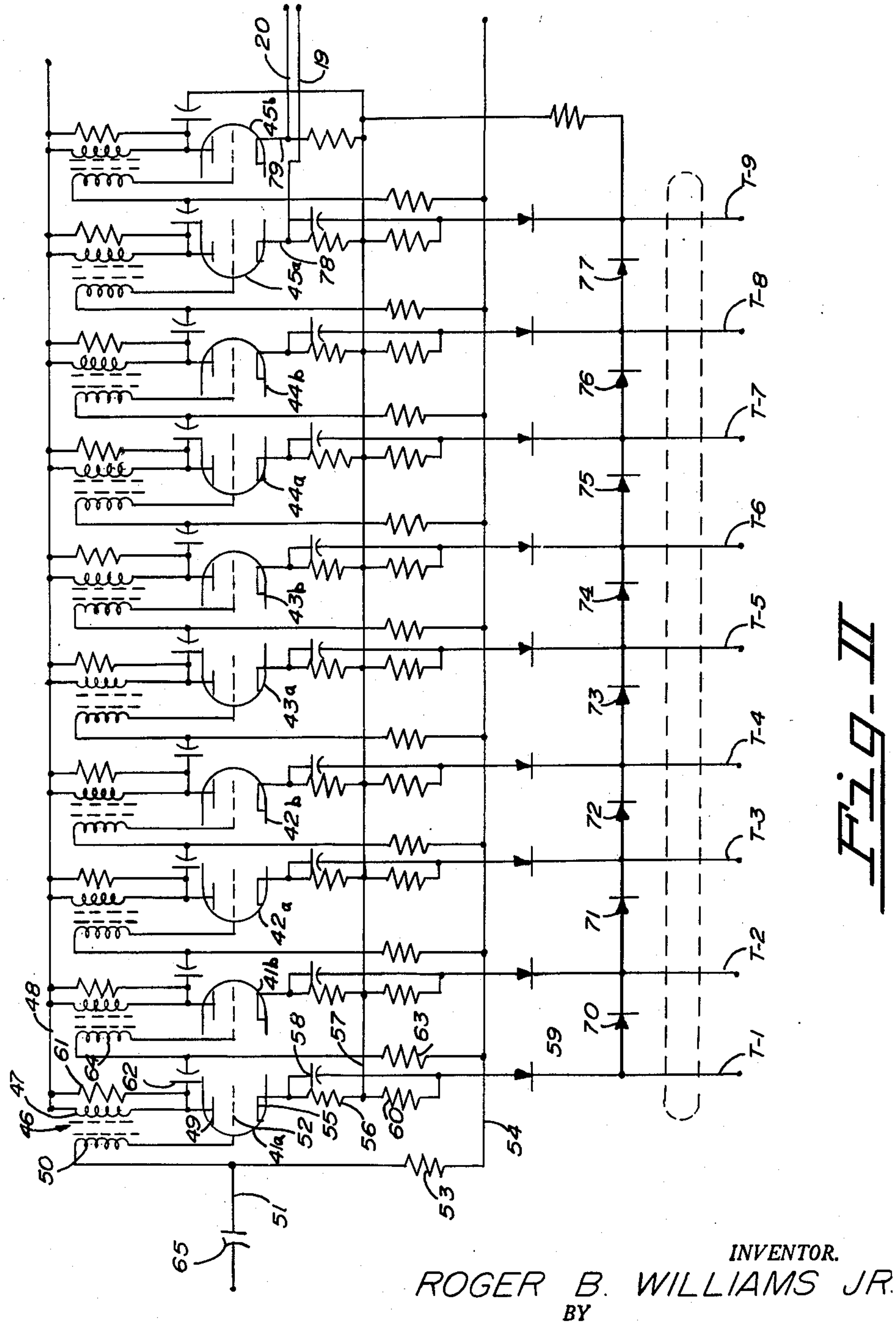
Fig-II
INVENTOR.
ROGER B. WILLIAMS JR.
BY
Marshall, Marshall & Yeasting
ATTORNEYS ELECTRONIC MULTIPLIER
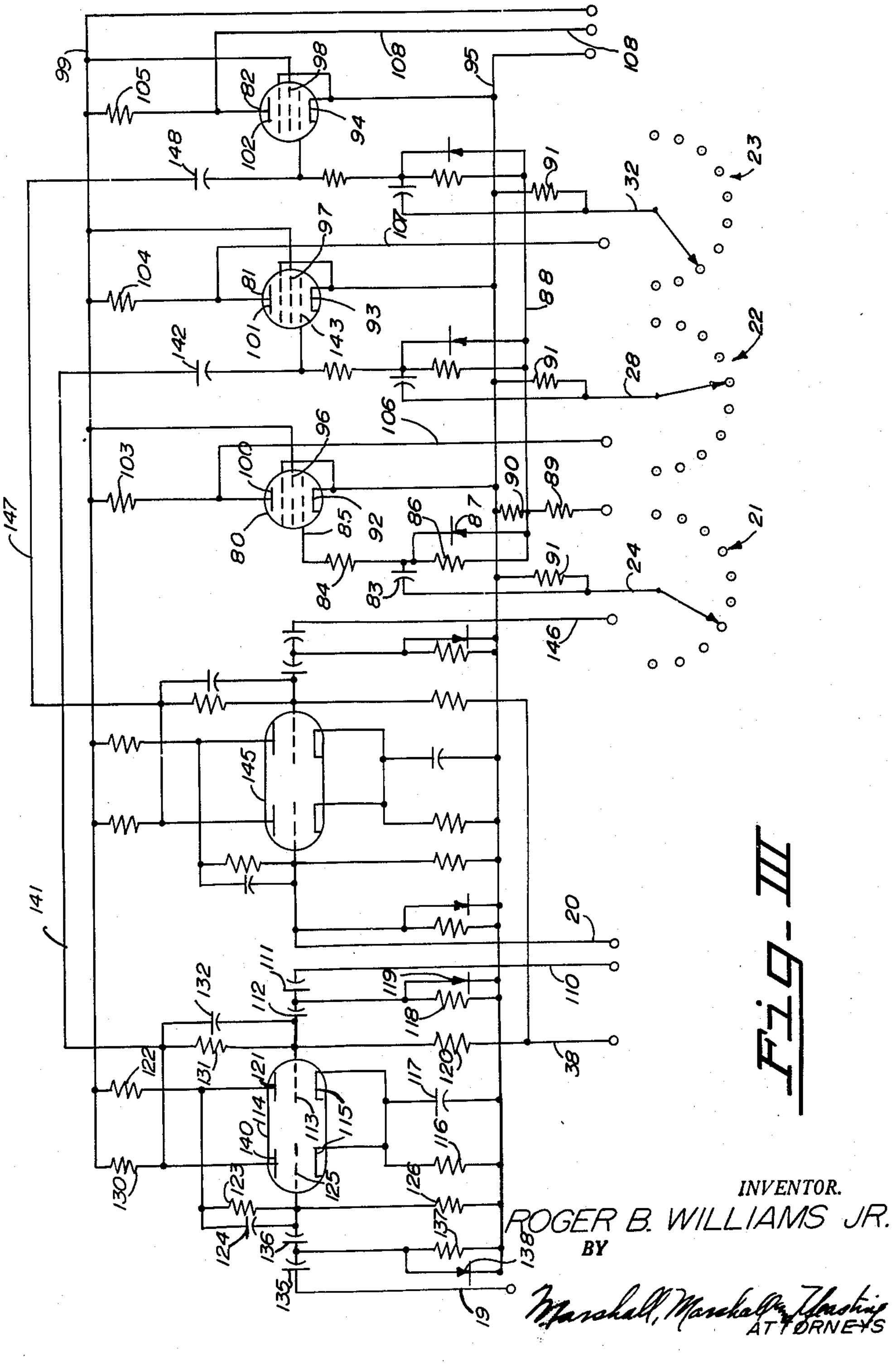
FIG. III
INVENTOR.
ROGER B. WILLIAMS JR.
BY
Marshall, Marshall & Yeasting
ATTORNEYS Sept. 27, 1960 R. B. WILLIAMS, JR 2,954,167
ELECTRONIC MULTIPLIER
Filed Sept. 20, 1955 4 Sheets-Sheet 4
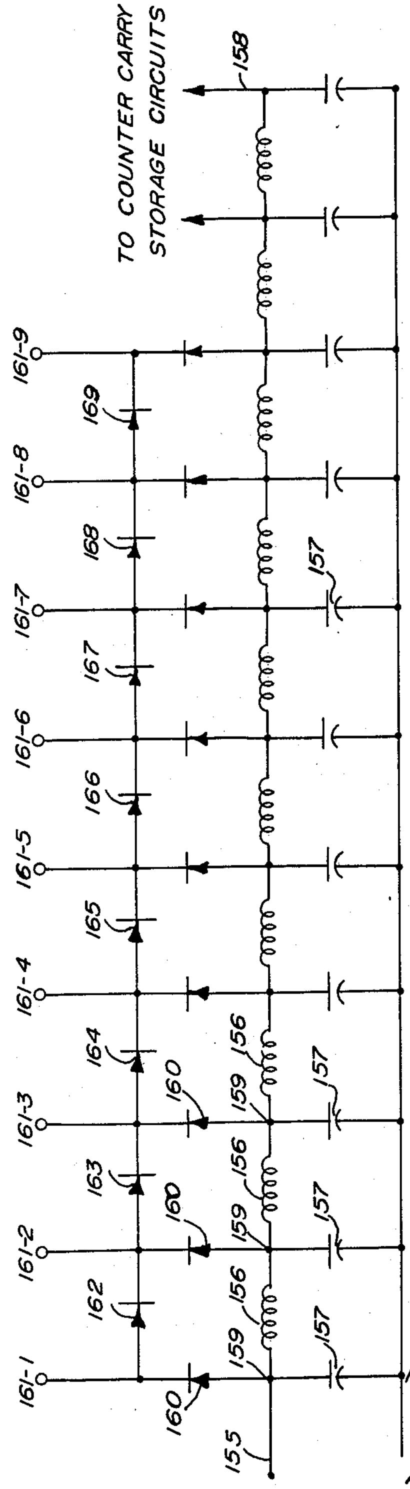
Fig-IV
INVENTOR.
ROGER B. WILLIAMS JR.
BY
Marshall, Marshall & Yeasting
ATTORNEYS United States Patent Office 2,954,167

Patented Sept. 27, 1960

2,954,167

ELECTRONIC MULTIPLIER

Roger B. Williams, Jr., Toledo, Ohio, assignor, by mesne assignments, to Toledo Scale Corporation, Toledo, Ohio, a corporation of Ohio Filed Sept. 20, 1955, Ser. No. 535,357

4 Claims. (Cl. 235—160)

This invention relates to electronic computing equipment and in particular to electronic equipment for operating on a series of pulses representing a multiplicand and delivering several series of pulses that may be applied to electronic counting equipment to register the product of the multiplicand and a multiplier factor set into the equipment.

Although highly complex, high speed electronic digital computers have been constructed and satisfactorily operated there are many medium speed multiplying operations that do not require the extreme speed of the large expensive electronic digital computers nor warrant the expense of the highly complex equipment.

The principal object of this invention is to provide a simple electronic multiplying system capable of operating on a pulse train representing a multiplicand and delivering pulses representing factors of the product suitable for counting in various stages of an electronic counter.

Another object of the invention is to provide simple electronic means for generating a controlled series of pulses for each pulse of a multiplicand and delivering various numbers of pulses of the series to various lines for selection prior to counting in a product counter.

A still further object of the invention is to provide simple electronic switching equipment such that portions of an invariant pulse train may be arbitrarily selected for counting in an electronic counter.

More specific objects and advantages are apparent from the following description of preferred forms of the invention.

According to the invention a pulse train generator capable of delivering pulse trains having nine pulses plus one pulse for each place in the multiplier following the first or units place is provided with output leads one for each of the pulses. The first nine output leads of the pulse generator system are interconnected preferably by a series of rectifiers, such that each of the output leads has impressed thereon the pulse from its own section of the generator plus pulses from all of the sections included between that particular section and one or the other end of the series of generators. The remaining pulses beyond the nine are employed for triggering carry delay stages introduced or interposed between successive decades of the electronic counter used to count or indicate the product of the multiplication. The actual pulse generator system may comprise a series of oscillators each of which executes one cycle of oscillation in response to an input voltage pulse and delivers, as an output pulse, a similar pulse to the next oscillator of the chain of oscillators comprising the generator. Such oscillators may be of the blocking oscillator variety—an inductive coupled system arranged to generate one cycle for each triggering impulse—or they may be of the multivibrator variety or any similar type of electronic amplifying type of oscillator. Transistors may be substituted for the electronic tubes in such a pulse generator. Likewise, similar results may be obtained by using a tapped delay line wherein the multiplicand pulses are applied to one end of the delay line and are transmitted through the delay line, the delayed pulses being taken off from the various taps and combined to produce the pulse trains required for the actual multiplication process.

Preferred embodiments of the invention are illustrated in the accompanying drawings.

In the drawings:

Figure I is a schematic diagram, in block form, illustrating the general organization of a multiplicand generator, the multiplier unit, and the switching and electronic counter arrangements for indicating both the multiplicand and the product resulting from the multiplication of the multiplicand by a multiplier selected by selector switches.

Figure II is a schematic wiring diagram of a blocking oscillator type of pulse generator system.

Figure III is a schematic diagram showing the amplifiers and flip-flop or bi-stable multivibrator stages interposed between certain stages or decades of the electronic product counter.

Figure IV is a schematic wiring diagram of a delay line and associated equipment that may be substituted for the oscillator type of pulse generator.

These specific figures and the accompanying description are intended merely to illustrate the invention but not to impose limitations on the claims.

Referring now to Figure I the multiplicand pulse generator 1 which may be a scanning device, as shown in application Serial No. 553,457 to Clarence E. Adler filed December 16, 1955, or a generally similar arrangement on a weighing scale, as shown in U.S. Patent No. 2,605,695 to L. L. Campbell, or any similar device adapted to produce a pulse train having a number of pulses corresponding to the magnitude of the multiplicand is arranged to deliver its pulses by way of output line 2 to an amplifier 3 that shapes the pulses for operation of a multiplier pulse generator 4. If the multiplicand pulse generator 1 is used in connection with a counter type or retail type weighing scale it may be desirable to provide an indication of weight which corresponds directly to the number of pulses in any one pulse train from the multiplicand pulse generator 1. In this event the pulses, after passing through the amplifier 3, are fed directly to a first decade 5 of a weight indicating counter 6. This counter, for example, may read to 99 pounds by increments of hundredths of pounds. Output pulses from the first decade 5 are transmitted through a connection 7 to a second decade 8 which reads in tenths of pounds and its output pulses in turn, are transmitted through another connection 9 to a third decade 10 arranged to count and indicate by pounds. The output of the pounds decade 10 is transmitted through a connection 11 to a fourth or final decade 12 which reads by tens of pounds.

Immediately prior to the generation of each train of impulses in the multiplicand generator 1, a reset pulse, which may be produced by the operation of contacts on the scanner or pulse generator 1, is applied through a lead 13 and branch leads 14, 15, 16, and 17 to each of the weight counter decades 5, 8, 10 and 12 respectively so as to reset the counter to zero in preparation for counting the next train of pulses.

Pulses from the amplifier 3 fed into the multiplier 4 are arranged to trigger or initiate a series of oscillations in the respective stages of the multiplier 4 and corresponding output pulses are transmitted to leads 18 connected respectively to terminals T–1, T–2, T–3, T–4, T–5, T–6, T–7, T–8 and T–9. The internal circuits of the multiplier 4 are arranged such that for each input pulse from the amplifier 3 the terminal T–1 receives one impulse corresponding to a unit digit in the multiplier. The next output terminal T–2 receives two impulses for each input pulse, similarly that one of the leads 18 connected to the terminal T–9 receives nine impulses for each input pulse from the amplifier 3. As a continuation of the series of pulses applied to the leads 18 the multiplier pulse generator generates for the control of the carry stages at least one additional impulse for each carry stage which impulse appear on leads 19 and 20 following the pulses applied to the leads 18.

A plurality of ten-point selector switches 21, 22 and 23 have their terminals connected in parallel to the pulse generator leads 18. That is, each of the selector switches 21, 22 and 23 has its zero terminal or first terminal open circuited or unconnected, has its next terminal connected to the generator terminal T–1 through one of the leads 18, has its next terminal connected to the terminal T–2, etc.

An output lead 24 of the first selector switch 21 is connected through an amplifier 25 to a first decade 26 of an electronic counter 27 employed to indicate the product of the multiplication. Likewise, the second selector switch 22 has its output lead 28 connected to a combined amplifier and flip-flop stage 30 that feeds a second decade 31 of the electronic counter 27. Likewise, the third selector switch 23 has its output lead 32 connected through another amplifier and flip-flop stage 33 that feeds a third decade 34 of the electronic counter 27. Output pulses from the decade 34 are transmitted directly to a fourth decade 35 and its output pulses in turn are transmitted to a fifth decade 36 and its output pulse to a sixth or final decade 37. In this arrangement the first selector switch 21 corresponds to the units digit of the multiplier factor while the selector switch 22 is set according to the tens digit of the multiplier and the selector switch 23 is set according to the hundreds digit of the multiplier. As applied to an ordinary retail computing scale the selector switches 21, 22, and 23 corresponds to the pennies, dimes, and dollars value respectively of the price per pound of the commodity being weighed.

The product or the amount counter 27 is reset to zero at the same time that the weight counter 6 is reset by pulses taken from the lead 13 and transmitted through a lead 38 having branch leads connected to each of the product counter decades and to the flip-flop stages 30 and 33.

Since the multiplier pulses from the multiplier 4 are fed simultaneously to the selector switches 21, 22, and 23 it is necessary to prevent any transfer of carry pulses directly from the first of the counter decades 26 to the next decade 31 or from decade 31 to the next higher decade 34. If these carry pulses from decade to decade were allowed to take place simultaneously with receipt of the pulses from the multiplier 4 erroneous results might be obtained since the higher decades would not distinguish between the multiplier and carry pulses and would give only a single count when it should respond to both when the carry pulse and the multiplier pulse coincide in time. Therefore each of the amplifier and flip-flop stages 30 and 33 is arranged to store the carry pulses from the preceding decade of the electronic counter 27 until the control pulses arrive by way of the pulse leads 19 and 20 from the multiplier. Since these control pulses occur later in time than the pulses from the leads 18 there is no interference involved.

In the arrangement shown the selector switches 21, 22, and 23 having been set to the value of the multiplier factor which may be the price per pound of a commodity and the reset pulse having reset the counters 6 and 27 the system is ready for a cycle of operation. This cycle may be initiated immediately following the reset pulse and consists first of generating in the generator 1 the series of pulses corresponding in number to the value of the multiplicand. These pulses transmitted through the amplifier 3 and to the counter 6 indicate the value of the multiplicand and transmitted through the multiplier 4 appear as series of pulses, one series for each pulse from the pulse generator 1. A selected portion of each of the series is selected by the selector switches for transmission to the counter 27. Thus, for example, if the selector switches 23, 22, and 21 had been set for $2.53 per pound two impulses would be taken from that one of the leads 18 connected to the terminal T–2 and transmitted through the flip-flop amplifier stage 33 directly to the third decade 34 of the counter 27. Since each of the pulses from the pulse generator in this example may correspond to a hundredth of a pound and since the setting of the selector switch 23 corresponds to the dollars value of the price it is apparent that each of the pulses transmitted from the selector switch 23 corresponds to one penny in the computed amount or the product. Thus the third decade 34 indicates "cents" and reads directly the pennies value of the product.

With this switch setting five pulses are transmitted through the selector switch 22 by reason of having been connected to that one of the leads 18 that is connected to the terminal T–5. These five pulses are transmitted throught the amplifier of the flip-flop stage 30 and applied to the decade 31 which reads in tenths of pennies. Since ordinarily the tenths of pennies are ignored in the product there is no visible indication or other record except for the carry pulses which are taken through the amplifier flip-flop 33 and added into the cents indicating counter 34. Likewise, in this example the pennies value of the multiplier, as set by the selector switch 21, transmits three impulses from the pulse generator 4 to the amplifier 25 of the first decade 26 of the counter 27. Since the product here is the partial product comprising hundredths of pounds by hundredths of dollars or pennies the product is in hundredths of cents. Again these are disregarded except for the carry pulses transmitted to the amplifier of the flip-flop stage 30 for addition into the tenths of pennies counter decade 31 and thus by accumulation enter into the pennies or cents decade 34.

As will be shown in detail later the flip-flop portions of the stages 30 and 33 are reset to a non-transmitting condition by the reset pulses and are left in that condition until they receive the carry pulse from the preceding counter decade. Should such a carry pulse be received then the final carry-clear pulse from the multiplier 4 as transmitted through the leads 19 or 20 resets the flip-flop stage and in so doing transmits a count signal to the following decade of the counter. If no carry pulse were received during the preceding series of pulses from the multiplier 4 the pulse from the leads 19 or 20 is without effect because the flip-flop is already in the reset condition.

The only speed limitation in this system is that the pulse repetition rate or frequency of the pulses from the multiplicand generator 1 shall not be greater than 1/12 of the maximum counting rate of the electronic counter decades 26, 31 or 34. Thus if 10,000 pulses per second are received from the multiplicand pulse generator 1 the counter decades 26, 31, and 34 must be capable of counting at least 120,000 counts per second. This requirement is imposed by the nature of multiplier 4 in that it must generate a series of 12 pulses for each input pulse and the counter 27 must be capable of counting the individual pulses from the pulse multiplier 4.

A preferred form of multiplier 4 is illustrated in Figure II. Such a multiplier comprises five dual triodes 41, 42, 43, 44, and 45 each of which has a first and second section distinguished by the subscripts A and B respectively. Each section of each of the dual triodes 41 to 45 inclusive is combined with other circuit elements to constitute a blocking oscillator. Each of the first nine sections comprising dual triodes 41, 42, 43, 44 and half of the triode 45 have identically similar associated circuitry. This circuitry for the first section, for example, includes a high frequency transformer 46 having a plate winding 47 connected between a high voltage or B+ lead 48 and a plate 49 of the dual triode section 41*a*. The transformer 46 has a grid winding 50 that is connected between an input lead 51 and a grid 52 of the dual triode. The input lead 51 is further connected through a resistor 53 to a grid bias lead 54 which is maintained at a suitable bias that just keeps the dual triode at current cutoff, i.e., sufficient bias is applied to the tube to prevent plate current flow. A cathode 55 of the dual triode cooperating with the grid 52 and plate 49 is connected through a resistor 56 to a grounded lead 57. Output pulses from this first blocking oscillator are delivered from its cathode 55 through a condenser 58 and a crystal diode 59 to output terminal T–1 connected to the first of the output leads 18. The junction between the condenser 58 and diode 59 is grounded through a resistor 60 such that the condenser 58 and resistor 60 has a time constant small compared to the time of one cycle of the blocking oscillator. Thus a very sharp positive impulse is applied through the crystal diode 59 to the output terminal T–1. Secondary oscillations or overshoot of plate voltage is minimized by a damping resistor 61 connected in parallel with the plate winding 47 of the transformer 46. The input pulse for the next stage of the blocking oscillator chain or series of oscillators is taken from the plate 49 through a condenser 62 that is connected between a grid resistor 63 for the second stage and the grid windings 64 of the transformer for the next stage.

In the operation of this circuit bias on the lead 54 is normally sufficient to maintain current cutoff conditions in the tube. When a positive voltage impulse from the amplifier 3 is transmitted through a coupling condenser 65 to the grid winding 50 of the transformer 46 the voltage impulse in the positive direction reduces the grid bias on the tube sufficiently so that plate current flows from the plate 49 to the cathode 55. This flow of plate current through the plate winding 47 of the transformer 46 generates an additional positive voltage at the grid terminal of the grid winding 50. This additional positive voltage causes still more current to flow through the plate winding 47 and the action is thus cumulative with a negative voltage pulse appearing at the plate 49 and positive voltage appearing at the cathode 55. When the current flow through the tube becomes a maximum value limited by the impedance of the transformer 46 and the cathode resistor 56 the increase in plate current ceases and the positive voltage generated in grid winding 50 of the transformer disappears. The grid voltage then goes negative or in a negative direction to reduce the flow of plate current. This reduction in the flow of plate current reverses the voltage generated in the grid winding 50 thereby immediately causing current cutoff in this triode.

The negative going plate voltage signal at a start of cycle of oscillation has no effect on the following oscillator. However, at the end of the cycle when the plate current decreases the positive going voltage at the plate 49 of the oscillator is transmitted through the condenser 62 and serves as a triggering impulse to start a cycle of oscillation in the following blocking oscillator. This cycle of oscillation in the following stage thus is delayed in time after the cycle of oscillation of the first stage. The signal pulse received on the lead 51 is thus passed from stage to stage down the chain of oscillators each one triggering the next and at the same time applying an output pulse through its condenser 58 and diode rectifier 59 to the corresponding output terminals T–1 to T–9. If the circuits included nothing more, each of the output terminals T–1, T–2, etc. would exhibit one pulse for each input pulse on the lead 51 the pulses being spaced in time according to the delay encountered from one stage to the next. In order that each of the output terminals may have a number of pulses for each input pulse corresponding to its position in the chain the terminals are interconnected by a series of diode rectifiers 70, 71, 72, 73, 74, 75, 76, and 77 connected respectively between the output terminals T–1, T–2, etc. so that the terminals are effectively connected in series insofar as transmission of positive pulses from the number 1 terminal toward the number 9 terminal are concerned. The diode rectifiers 70 to 77 inclusive prevent any flow of signals from the 9th or 8th stages etc. to stages ahead of these particular stages. In other words, signals may be transmitted from the number 1 terminal toward the number 9 but may not be transmitted in reverse order. This arrangement of diode rectifiers causes the output pulse of the number 1 oscillator 41–*a* to appear on all nine output terminals T–1 to T–9 inclusive. The output pulse from the second blocking oscillator 41–*b* appears on a second to ninth terminals respectively but does not appear on the number 1, that is, the T–1 terminal. Similarly for the remaining terminals T–3, T–4, etc. in that each terminal receives a pulse from its own blocking oscillator as well as pulses from all the blocking oscillators preceding it in the chain.

The pulse generator also delivers two additional pulses, for clearing the carry stages 30 and 33, delayed in time after a series of pulses appearing on the output terminals T–1, to T–9 inclusive, these pulses being obtained from the cathodes 78 and 79 of the 9th and 10th blocking oscillator stages respectively. These clearing pulses, employed by the remainder of the equipment, are negative going portions of the cathode signal.

In the ordinary construction of the equipment the oscillator stages in the pulse generator may conveniently be mounted on a single plug-in chassis having the leads from the nine output terminals T–1 to T–9 inclusive brought out through one cable and having the supply voltages and the clearing pulses brought out through a second cable.

Voltage pulses appearing on the output terminals T–1 to T–9 of Figure II are applied through selector switches 21, 22, and 23, Figures I and III, to input circuits to amplifier tubes 80, 81, and 82 of the amplifier 25, flip-flop 30 and flip-flop 33 respectively. Each of the input circuits includes in series a condenser 83 and resistor 84 leading to a grid 85 of the associated amplifier tube 80, 81 or 82. Grid bias is provided by grid leak resistor 86 that is by-passed by a crystal rectifier 87 to prevent the build up of any negative bias on the tube beyond that supplied from a bias lead 88 maintained at approximately cutoff potential for the tube. The bias potential for the tube may be conveniently obtained from the bias voltage supply for the multiplier pulse generator through a voltage divider network including resistors 89 and 90.

Since the cable carrying the leads from the output terminals T–1 to T–9 inclusive may have considerable capacity between the leads and the grounded shield, each of the output terminals for the selector switches 21, 22, 23, is grounded through resistors 91 to eliminate or reduce the effect of stray signals appearing on these leads as a result of the inter wire capacitance in the cable.

Each of the amplifiers 80, 81, and 82 has its cathode 92, 93 or 94 connected directly to a grounded lead 95. Screen grids 96, 97 and 98 are connected directly to a positive supply voltage lead 99. The suppressor grids, the remaining grid in each of the tubes, is connected to the cathode as is customary practice. Plates 100, 101 and 102 are connected through plate resistors 103, 104 and 105 directly to the positive voltage supply lead 99. The plates of the tubes are also connected through leads 106, 107 and 108 to the inputs of the succeeding counter decades 26, 31, and 34 respectively. The carry pulse from the first decade 26 is transmitted through a lead 110 and coupling condensers 111 and 112 to a first grid 113 of a flip-flop stage amplifier tube 114 included in the flip-flop stage and amplifier 30. The tube 114 is a dual triode and has both of its cathodes 115 connected to the grounded lead 95 through a cathode resistor 116 that is bypassed with a condenser 117. The input circuit from the lead 110 is also connected to ground by a resistor 118 connected between the grounded lead 95 and the midtap between the condensers 111 and 112. This resistor 118 is bypassed with a diode rectifier 119 which cooperating with the condenser 111 shunts positive voltage pulses to ground and permits negative pulses to be transmitted to the grid 113.

The grid 113 is also connected through a resistor 120 to the reset pulse lead 38.

The tube 114 is a dual triode connected as a bistable multivibrator. In this type of circuit a plate 121 cooperating with a grid 113 is connected through a plate resistor 122 to the "B" plus lead 99 and is connected through a resistor 123 and condenser 124 to a second control grid 125 of the tube 114. This grid 125 is also connected through a resistor 126 to the grounded lead 95. The resistors 122, 123, and 126 are thus connected in series between the positive voltage lead 99 and the grounded lead 95 with the junctions connected to the plate 121 and the grid 125. Likewise, a similar circuit for the other side of the tube comprises a plate resistor 130, a plate to grid resistor 131 which is bypassed by the condenser 132 and the resistor 120 which is connected to the reset pulse lead which is at ground potential. The clearing pulse transmitted from the multiplier oscillator through the lead 21 is applied through condensers 135 and 136 to the control grid 125. The junction between the condensers 135 and 136 is connected to ground through a resistor 137 and diode rectifier 138. The rectifier 138 is polarized so as to shunt positive voltage impulses directly to ground and permit negative pulses to be applied to the control grid 125.

The tube 114, the flip-flop of the flip-flop and amplifier stage 30 actually serves to store the carry pulses from the first decade 26 so as to transmit such pulses at the proper time to the next counter decade 31. In this operation the dual triode 114 is normally in the condition with plate current flowing through the resistor 122, plate 121, right hand cathode 115, and cathode resistor 116 connected to ground. The drop in voltage appearing across the resistor 122 creates sufficient bias at the grid 125 to prevent any plate current flow to the corresponding plate 140 and thus without plate current flow through the resistor 130 the grid 113 is maintained sufficiently positive to maintain current flow from the plate 121 past the grid 113 to its cooperating cathode. This condition may be brought about either by a positive going reset pulse applied to the lead 38 so as to momentarily drive the grid 113 positive or by means of the clearing pulse from the cathode 78 of the ninth oscillator of the multiplier oscillator chain applied through the lead 19 as a negative pulse and applied to the grid 125. Thus a positive pulse on the reset lead 38 or negative going pulse the trailing edge of the positive voltage from the cathode 79 of the ninth oscillator applied to the grid 125, causes current conduction through the right hand section of the dual triode. If the tube is in this condition when these pulses arrive there is no change in the plate voltage distribution and hence no signal appearing at the plate 140. However, if following the last reset or clearing pulse a negative going pulse is received from the decade counter 26 through the lead 110, which carry pulse appears when this decade 26 fills and resets to zero, such pulse drives the grid 113 negative to cut off current flow between the plate 121 and the cathode 115. The resulting positive voltage appearing at the plate 121 and applied to the grid 125 produces current flow from the plate 140 through the left-hand section of the tube. This current flow causes a drop in voltage at the plate 140 which, applied to the grid 113 maintains the grid 113 at or below cutoff potential. The tube then remains in this stable condition until the next clearing pulse appears on the lead 19 or positive reset pulse appears on the lead 38. Normally the tube is reset to its first condition by the pulses from the multiplier through the lead 19, the reset pulses being applied merely as a safety measure to prevent false operation at the start of a new train of multiplicand pulses.

When the next clearing pulse appears after a carry pulse has been received the tube reverts to its original current flow condition and a sharp positive voltage pulse from the plate 140 is transmitted through a lead 141 and a small condenser 142 to a control grid 143 of the second amplifier tube 81. The circuit for this amplifier tube 81 is similar to the circuit for the tube 80 except for the carry signal applied through the small condenser 142 connected directly to the control grid 143. This positive pulse occurring at the control grid 143 is amplified through the amplifier and appears as the negative pulse on the output lead 107 leading directly to the next decade 31 of the counter.

This circuit thus provides means for transmitting pulses from selected terminals of the multiplier pulse generator 4 directly to the corresponding decade of the electronic counter 27 and also adding, at the end of each series of multiplier pulses, one additional pulse provided the preceding decade of the counter had transmitted a carry impulse. Should there be no carry impulse then there is no additional pulse transmitted to the following decade.

A similar circuit including a dual triode 145 is included to accept carry pulses from an output lead 146 of the decade 31 and clearing pulses from the clearing pulse lead 20 and deliver a delayed carry pulse through lead 147 and condenser 148 to a control grid 149 of the amplifier tube 82. This tube 82 operates like the tube 81 accepting multiplier pulses from the lead 32 of selector switch 23 and delayed carry pulses from the tube 145 and delivering amplified pulses through lead 108 to the next counter decade 34. In this arrangement three amplifier tubes 80, 81, and 82 are provided one for each place of the multiplier corresponding to the multiplier selector switches 21, 22, and 23. Thus if multiplier factors having three digits are used the units digit is set on the selector switch 21, the tens digit on the selector switch 22, and the hundreds digit on the selector switch 23. Additional multiplier digits may be accommodated by adding corresponding amplifier stages, selector switches, and flip-flop stages such as the tube 114. Thus with three digits in the multiplier two flip-flop stages are employed whereas four digits in the multiplier would require three such flip-flop stages.

In this multiplier arrangement the maximum speed of operation is fixed by the counting rate of the counter decades that are driven by the amplifier tubes 80, 81 and 82. The input pulses from the multiplicand pulse generator to the multiplier pulse generator must not be greater than approximately one-twelfth to one-fifteenth of the maximum counting rate of the counter decades 26, 31, and 34. This is because each input pulse is used to generate, in the multiplier pulse generator, a series of pulses having at least ten pulses and perhaps more if larger multiplier factors are used and each chain of such ten to twelve or more pulses must be accurately counted for each input cycle.

Several types of pulse generators may be used in the multiplier. In Figure II the blocking oscillator type of pulse generator was shown and the cooperating circuits described. Other types of controls may include the transistor type of amplifier connected as a blocking oscillator, or vacuum tubes connected as multivibrators, one such multivibrator for each stage. In any of these circuit arrangements a series of oscillations is provided, one cycle of oscillation for each of the number 1 through 9 plus additional cycles to give the timing pulses at the end of each chain of pulses. All these oscillators have the feature that they each go through a single cycle of operation for each input pulse and deliver a similar input pulse to the next stage of the chain of oscillators and suitably energize the selector switches for selecting the pulses for the counter.

An entirely passive network may be substituted for the pulse generator oscillator system disclosed in the previous figures. One such possible arrangement is shown in Figure IV in which a delay line is provided, the delay line being tapped at several points along its length such that the pulses traveling along the line may be transmitted from the various tapped points directly to the selector switches. Referring to Figure IV input pulses from the multiplicand pulse generator 1 are applied to an input lead 155 to a delay line consisting of a series of inductance elements 156 and capacitors 157 arranged to transmit the impulses from the input lead 155 to an output lead 158 that is connected to the second carry clearing pulse lead such as lead 20 of Figure I. While only a single inductance and capacitor is shown between each of taps 159 of the delay line it is to be understood that more sections may be used between each tap in order to increase the effective resolution of the pulses at the required lag or time delay. Thus ordinarily three or four sections of inductance and capacity would be employed between each tap. Each of the taps 159 of the delay line shown in Figure IV is connected through a diode rectifier 160 to an output terminal 161–1, 161–2, and so on there being one such terminal of each of the nine possible values of a digit of the multiplier. These are the terminals that are connected directly to the selectors switches 21, 22, and 23 as shown in Figure III. These output terminals 161–1 and so forth are connected in a series for the transmission of pulses one way along the series by a plurality of diode rectifiers 162, 163, 164, and so forth to 169. These rectifiers are connected so that pulses may be transmitted from the first tap 159 of the delay line, that is the tap connected through the rectifier 160 to the output terminal 161–1 to the second output terminal 161–2 and from the second terminal to the third and so on down the line. In this combination each succeeding output terminal receives all of the pulses taken from the preceding taps of the delay line up to and including its own. It does not receive any pulses from any taps subsequent to its own tap. Thus in this arrangement the output terminal 161–1 delivers one pulse for each input pulse on lead 155 while each succeeding output terminal such as 161–2, 161–3, 161–4, and so forth each deliver a number of pulses corresponding to its position in the series. The delay line is continued past the ninth tap 161–9 to provide two additional taps which are suitable for supplying the pulses for the carry clear signals required on the leads 19 and 20. By putting these taps at the end of the line a suitable delay is obtained so that these carry clear pulses arrive and clear the carry signal delay stage after the counting for each multiplier digit has been completed.

This parallel system of multiplication based on multiplying each input pulse from the multiplicand by each digit of the multiplier at the same time and feeding the multiplied pulses into the corresponding decades of the electronic counter provides a simple, reasonably fast system for multiplying quantities which may be in the order of a thousand and not exceeding ten thousand. When constructed of ordinary components the multiplier is capable of operating at speeds in the order of five hundred thousand to a million output pulses per second corresponding to thirty thousand to fifty thousand input pulses per second. Thus to multiply a quantity represented by 10,000 pulses by a 3 digit multiplier would require approximately one-third of a second. While this is slow compared to the more elaborate electronic digital computing mechanisms it is nevertheless sufficiently fast for many purposes such as computing scales and so forth and does not require the complexity of equipment that is required for the higher speed operations.

Various modifications of the circuits illustrated for use in a parallel type electronic multiplier may be made without parting from the scope of the invention.

Having described the invention, I claim:

1. In an electronic multiplier, in combination, means supplying a train of electrical pulses corresponding to a multiplicand, a pulse generator adapted to produce a series containing a predetermined number of pulses separated in time and at least one control pulse following such series for each multiplicand pulse, said generator having a plurality of terminals upon which certain of said pulses appear, a series of output leads one for each value of a digit in a multiplier, a control lead for each control pulse, means connecting each terminal to an associated output lead, rectifier means connecting each output lead to the adjacent lead in the series, a plurality of electronic counter decades one for each place in the product, selector switches one for each place in the multiplier for connecting a selected output lead to the associated product decade, and carry storage circuit means connected between the counter decades receiving multiplier pulses and responsive to output pulses of the preceding decade and said control pulse for transferring carry pulses from one decade to the next at the close of each series of multiplier pulses.

2. In an electronic multiplier, in combination, means supplying a train of electrical pulses corresponding to a multiplicand, a pulse generator adapted to produce a predetermined series of pulses spaced in time and at least one control pulse following such series for each multiplicand pulse, said generator having a plurality of output leads each of which carries a different predetermined number of pulses of the predetermined series of pulses a control lead for each control pulse, a selector switch corresponding to each place in a multiplier, each switch being connected to said output leads for selecting the lead corresponding to the value of corresponding multiplier digit, a product register having a plurality of decades, said selector switches being connected to certain of said product decades, and carry storage circuit means connected between certain of said product decades and to said control lead of the pulse generator for transmitting carry pulses from one decade to the next at the termination of each predetermined series of pulses.

3. In an electronic multiplier, in combination, means supplying a train of electrical pulses corresponding to a multiplicand, a pulse generator adapted to produce a constant predetermined series of pulses spaced in time for each multiplicand pulse, said generator having a plurality of output leads each of which carries a different predetermined number of pulses of the predetermined series of pulses and at least one output lead carrying a single pulse occurring at the end of said predetermined series of pulses, a product register comprising a plurality of electronic counter decades, a multiplier register comprising a plurality of selector switches one for each place in the multiplier, said switches being connected between said output leads and certain of said product register decades, and at least one flip-flop stage connected between certain of the product register decades and to said one output lead of the pulse generator for storing carry pulses during the series of pulses and transmitting carry pulses to the next decade of the product register in response to the single pulse at the end of each series of pulses.

4. An electronic computer according to claim 3 having a mixing amplifier adapted to receive multiplier and flip-flop signals and transmit such signals to a product register decade.

(References on following page)

References Cited in the file of this patent

UNITED STATES PATENTS

| | | |
|---|---|---|
| 2,373,134 | Massonneau | Apr. 10, 1945 |
| 2,398,771 | Compton | Apr. 23, 1946 |
| 2,428,089 | Mumma et al. | Sept. 30, 1947 |
| 2,442,428 | Mumma | June 1, 1948 |
| 2,573,316 | Dickenson | Oct. 30, 1951 |
| 2,573,813 | Shumard | Nov. 6, 1951 |
| 2,617,931 | Trousdale | Nov. 11, 1952 |
| 2,639,378 | Moerman | May 19, 1953 |
| 2,700,503 | Crosman | Jan. 25, 1955 |
| 2,745,599 | Woods-Hill | May 15, 1956 |
| 2,749,037 | Stibitz | June 5, 1956 |
| 2,790,599 | Gloess | Apr. 30, 1957 |

OTHER REFERENCES

Richards: Arithmetic Operations in Digital Computers, D. Van Nostrand Co., Inc., New York (Mar. 17, 1955), pps. 266 and 267 relied on.